(12) United States Patent
Scott et al.

(10) Patent No.: US 8,555,517 B2
(45) Date of Patent: Oct. 15, 2013

(54) HAND SAW

(75) Inventors: John S. Scott, Brookfield, WI (US);
Michael S. Steele, Waukesha, WI (US);
Troy C. Thorson, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 598 days.

(21) Appl. No.: 12/701,255

(22) Filed: Feb. 5, 2010

(65) Prior Publication Data
US 2010/0192392 A1 Aug. 5, 2010

Related U.S. Application Data

(60) Provisional application No. 61/150,149, filed on Feb. 5, 2009, provisional application No. 61/219,607, filed on Jun. 23, 2009.

(51) Int. Cl.
*B27B 21/00* (2006.01)
*B27B 21/02* (2006.01)
*B27B 21/06* (2006.01)

(52) U.S. Cl.
USPC .................................. 30/506; 30/507; 30/513

(58) Field of Classification Search
USPC .................... 30/506, 507, 512, 513; D8/96
See application file for complete search history.

(56) References Cited

U.S. PATENT DOCUMENTS

| | | | | |
|---|---|---|---|---|
| 280,928 A | * | 7/1883 | Hoffman | 30/513 |
| 617,178 A | * | 1/1899 | Nusser | 30/513 |
| 739,457 A | * | 9/1903 | Tilden | 30/513 |
| 766,077 A | * | 7/1904 | Tilden | 30/513 |
| 963,848 A | * | 7/1910 | Anderson | 30/513 |
| 1,066,659 A | * | 7/1913 | Rodehaver | 30/513 |
| 1,080,365 A | * | 12/1913 | O'Neill et al. | 30/513 |
| 1,094,939 A | * | 4/1914 | Smith | 30/513 |
| 1,113,591 A | * | 10/1914 | Wood | 30/513 |

(Continued)

FOREIGN PATENT DOCUMENTS

| | | | |
|---|---|---|---|
| CA | 2751687 A1 | * | 8/2010 |
| CN | 202895361 U | * | 4/2013 |

(Continued)

OTHER PUBLICATIONS

PCT/US2010/023370 International Search Report and Written Opinion dated Apr. 8, 2010 (8 pages).

(Continued)

*Primary Examiner* — Jason Daniel Prone
(74) *Attorney, Agent, or Firm* — Michael Best & Friedrich LLP

(57) ABSTRACT

A hand saw that includes a frame, a lever, and a rod movable in a first direction to increase a distance between a first blade support and a second blade support and the rod is movable in a second direction to decrease the distance between the first blade support and the second blade support. The rod is coupled to the lever and the frame such that the rod is movable in the first direction and with the lever when the lever moves from a release position toward a tension position in order to tension the blade. The rod is coupled to the lever and the frame such that the rod is movable with respect to the frame in the first direction and the second direction and movable in the first direction and the second direction independent of the lever when the lever is in the release position.

16 Claims, 7 Drawing Sheets

(56) References Cited

U.S. PATENT DOCUMENTS

| | | | |
|---|---|---|---|
| 1,446,674 A * | 2/1923 | Thompson | 30/513 |
| 1,484,168 A * | 2/1924 | Bertas et al. | 30/513 |
| 1,517,827 A * | 12/1924 | De Grado | 30/513 |
| 1,657,748 A * | 1/1928 | Hanning | 30/513 |
| 2,335,141 A * | 11/1943 | Blum | 30/513 |
| 2,435,964 A * | 2/1948 | Graff | 30/513 |
| 2,519,904 A | 8/1950 | Hendricksen et al. | |
| 2,546,660 A * | 3/1951 | Wilcox | 30/506 |
| 2,613,709 A * | 10/1952 | Terrill et al. | 30/513 |
| 2,651,341 A * | 9/1953 | Hammarstrom | 30/513 |
| 2,725,911 A * | 12/1955 | Glenn | 30/506 |
| 2,880,773 A * | 4/1959 | Contreras et al. | 30/513 |
| 3,060,983 A * | 10/1962 | Andreasson | 30/513 |
| 3,329,187 A * | 7/1967 | Cowley | 30/513 |
| 3,636,997 A * | 1/1972 | Keymer | 30/513 |
| 3,822,731 A * | 7/1974 | Keymer | 30/513 |
| 4,349,059 A * | 9/1982 | Hepworth et al. | 30/513 |
| 4,376,456 A | 3/1983 | Jacoff | |
| 4,466,471 A | 8/1984 | Thomson | |
| 5,388,333 A | 2/1995 | Chen | |
| 5,673,488 A | 10/1997 | Grayo | |
| 5,768,788 A | 6/1998 | Arnold | |
| 5,826,344 A * | 10/1998 | Phelon et al. | 30/513 |
| 6,070,330 A | 6/2000 | Phelon et al. | |
| 6,079,109 A | 6/2000 | Ranieri | |
| 6,266,887 B1 * | 7/2001 | Owens et al. | 30/513 |
| 6,457,244 B1 | 10/2002 | Huang | |
| 6,606,795 B2 | 8/2003 | Erisoty et al. | |
| 6,742,268 B2 | 6/2004 | Chen | |
| 6,772,522 B1 | 8/2004 | Huang et al. | |
| 6,820,340 B1 | 11/2004 | Martin et al. | |
| 6,925,720 B2 | 8/2005 | Ranieri | |
| 7,007,394 B2 | 3/2006 | Erisoty et al. | |
| 7,210,234 B2 | 5/2007 | Chen | |
| 7,254,893 B1 | 8/2007 | Huang | |
| 8,261,456 B2 * | 9/2012 | Scott et al. | 30/517 |
| 2003/0229995 A1 * | 12/2003 | Huang | 30/513 |
| 2004/0074099 A1 | 4/2004 | Chen | |
| 2005/0044731 A1 * | 3/2005 | Ranieri | 30/513 |
| 2009/0113729 A1 | 5/2009 | Chen | |
| 2009/0265944 A1 * | 10/2009 | Chao | 30/513 |
| 2010/0319201 A1 * | 12/2010 | Scott et al. | 30/166.3 |
| 2012/0324745 A1 * | 12/2012 | Scott et al. | 30/517 |

FOREIGN PATENT DOCUMENTS

| | | |
|---|---|---|
| DE | 20217051 | 1/2003 |
| EP | 2266742 A1 * | 12/2010 |
| WO | WO 2010091288 A1 * | 8/2010 |

OTHER PUBLICATIONS

First Patent Examination Report from the Intellectual Property Office of the Australian Government for Application No. AU2010210498 dated Dec. 11, 2012 (3 pages).

Office Action from the Canadian Intellectual Property Office for Application No. 2751687 dated Mar. 21, 2013 (4 pages).

EP10739187.2 Extended European Search Report dated Jun. 5, 2013 (7 pages).

* cited by examiner

HAND SAW

CROSS-REFERENCE TO RELATED APPLICATIONS

This application claims priority to U.S. Provisional Patent Application No. 61/150,149, filed Feb. 5, 2009, and U.S. Provisional Patent Application No. 61/219,607, filed Jun. 23, 2009, the entire contents of which are all incorporated by reference herein.

BACKGROUND

The present invention relates to saws, and more particularly, to hand saws.

Hand saws typically include a frame that supports a cutting blade. The frame can also form a handle of the saw that the user may grasp in order reciprocate the saw with respect to a workpiece to cut the workpiece with the blade. One type of hand saw is known as a hacksaw. Hacksaws often include a U-shaped or arched frame and the blade is coupled to the frame such that the blade spans the arch or ends of the frame. The blade of a hacksaw is often coupled to the frame under tension.

SUMMARY

In one construction, the invention provides a hand saw that includes a blade having a first end, a second end, and a longitudinal axis that extends between the first end and the second end. The saw further includes a frame configured to support the blade. The frame includes a first blade support configured to removably couple the blade to the frame, and the frame defines a handle of the hand saw. The handle is configured to be grasped by a user of the hand saw to reciprocate the blade along the longitudinal axis to cut a workpiece. A lever is pivotally coupled to the frame such that the lever pivots with respect to the frame between a release position and a tension position. A rod including a second blade support is configured to removably couple the blade to the frame. The rod is coupled to the frame such that the rod is movable with respect to the frame in a first direction to increase a distance between the first blade support and the second blade support and the rod is movable with respect to the frame in a second direction to decrease the distance between the first blade support and the second blade support. A biasing member biases the rod toward the second direction. The rod is coupled to the lever and the frame such that the rod is movable in the first direction and with the lever when the lever moves from the release position toward the tension position in order to tension the blade. The rod is coupled to the lever and the frame such that the rod is movable with respect to the frame in the first direction and the second direction and movable in the first direction and the second direction independent of the lever when the lever is in the release position.

In another construction the invention provides a hand saw that includes a blade having a first end, a second end, and a longitudinal axis that extends between the first end and the second end. The saw further includes a frame configured to support the blade. The frame includes a first blade support configured to removably couple the blade to the frame, and the frame defines a handle of the hand saw. The handle is configured to be grasped by a user of the hand saw to reciprocate the blade along the longitudinal axis to cut a workpiece. A lever is pivotally coupled to the frame such that the lever pivots with respect to the frame between a release position and a tension position. A rod including a second blade support is configured to removably couple the blade to the frame. The rod is coupled to the frame such that the rod is movable with respect to the frame in a first direction to increase a distance between the first blade support and the second blade support and the rod is movable with respect to the frame in a second direction to decrease the distance between the first blade support and the second blade support. The rod is coupled to the lever and the frame such that the rod is movable in the first direction and with the lever when the lever moves from the release position toward the tension position in order to tension the blade. The rod is coupled to the lever and the frame such that the rod is movable with respect to the frame in the first direction and the second direction and movable in the first direction and the second direction independent of the lever when the lever is in the release position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
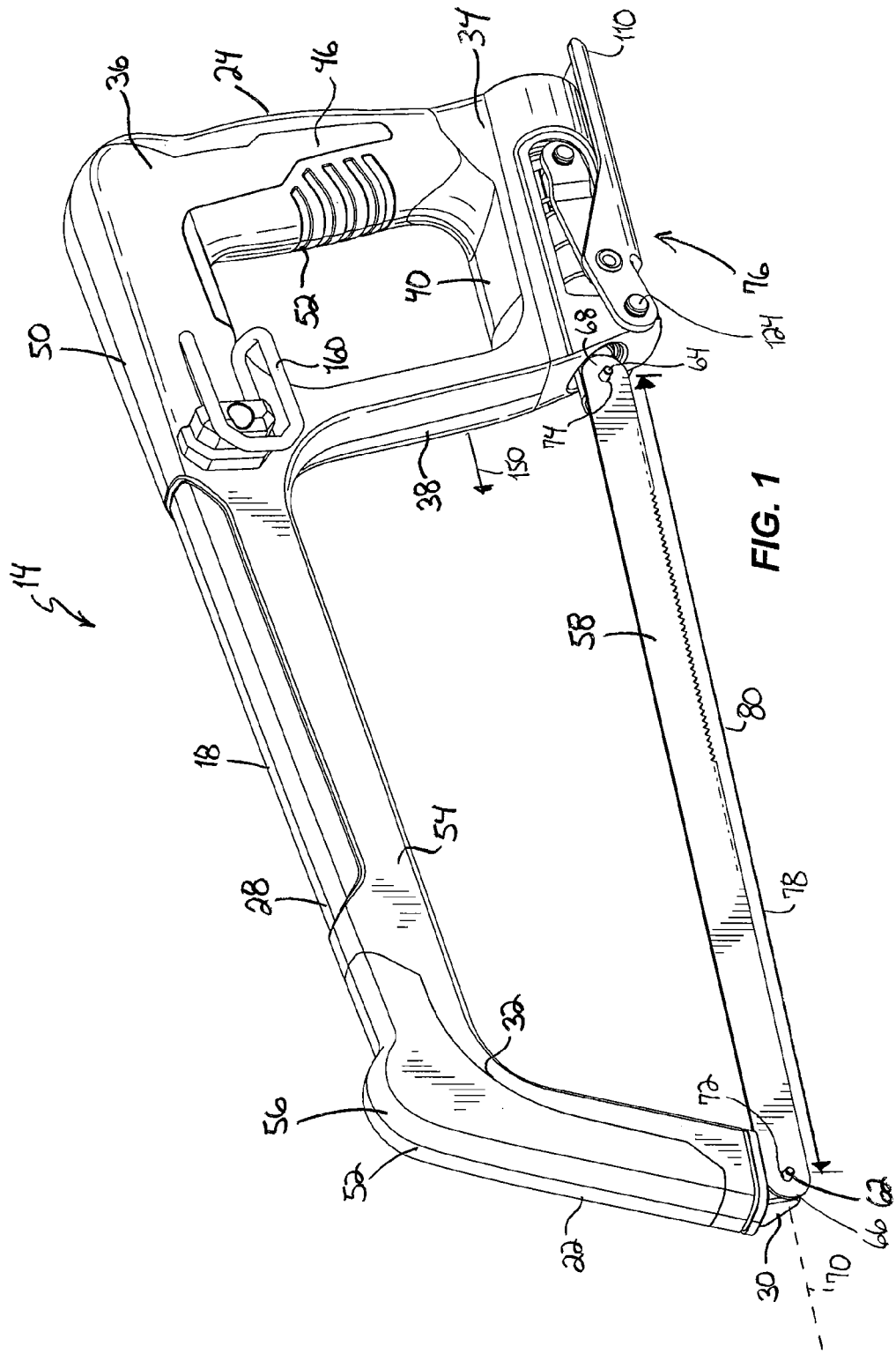
FIG. 1 is a perspective view taken from a first side of a hand saw according to one construction of the invention.
Figure 3:
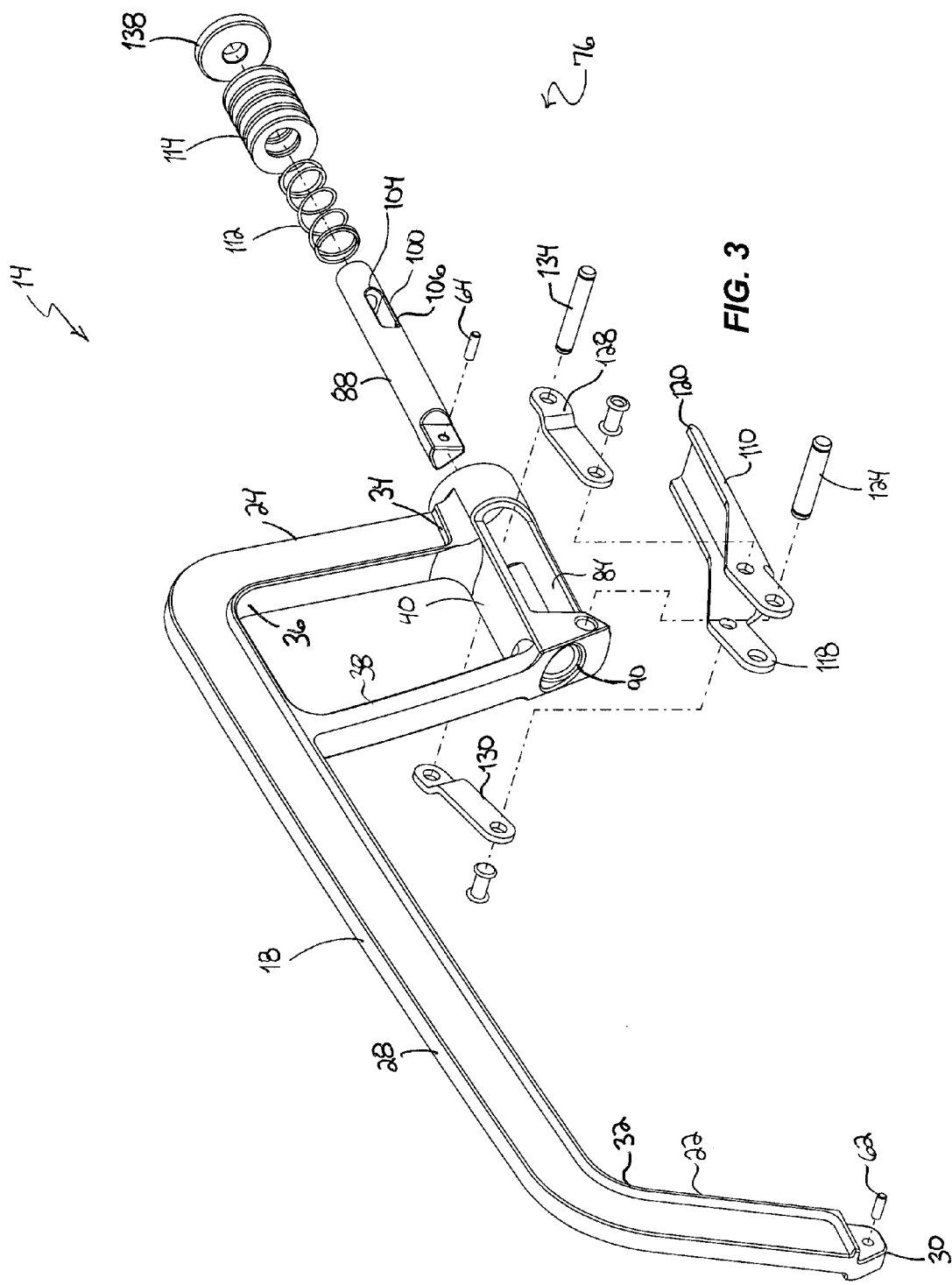
FIG. 3 is an exploded view of the hand saw of FIG. 1 with an outer body and over-moldings removed.

FIG. 1 illustrates a hand saw 14, which is a hacksaw in the illustrated construction. While the illustrated hand saw 14 is a hacksaw, in other constructions, the saw could be any suitable type of saw. Referring to FIG. 3, the hacksaw 14 includes a generally U-shaped frame 18 having a first leg 22, a second leg 24, and a cross-member 28 that extends from the first leg 22 to the second leg 24. The first leg 22 includes a first end 30 and a second end 32. The second leg 24 includes a first end 34 and a second end 36. The cross-member 28 extends from the second end 32 of the first leg 22 to the second end 36 of the second leg 24. The frame 18 further includes a support member 38, which is also a handle guard in the illustrated construction. A base 40 of the frame 18 extends from the first end 34 of the second leg 24 to the support member 38. Referring to FIG. 1, a handle 46 is formed by the second leg 24 to provide one place for the user of the hacksaw 14 to grip while using the hacksaw 14. The frame 18 can be formed from metal materials such as cast steel, die cast A380 aluminum, titanium, and the like. In other constructions, other suitable types of materials may be utilized.

While the hacksaw 14 of FIGS. 1-5 includes the generally U-shaped frame 18, in other constructions, other types and shapes of frames may be utilized. For example, in other constructions, the cross-member 28 may be curved so that the frame is a low profile hacksaw frame having a height at a front portion of the frame that is less than a height at a rear portion of the frame.

Referring to FIGS. 1 and 3, the illustrated hacksaw 14 includes an outer covering 50 (FIG. 1) that surrounds the frame 18. The illustrated outer covering 50 includes thermoplastic elastomer (TPE) over-moldings 52 and an injection molded outer body covering 54 formed from Nylon 6 in one construction. As best seen in FIG. 1, a second or auxiliary handle 56 is formed by the over-molding 52 and the first leg 22. The second handle 56 provides the user with an additional or alternative place to grip the saw 14.

A blade 58 (FIG. 1) of the hacksaw 14 is coupled to the frame 18 by a first blade support 62 and a second blade support 64. The blade 58 includes a first end 66, a second end 68, and a longitudinal axis 70 that extends between the first end 66 and the second end 68. The blade 58 further includes a first aperture 72 adjacent the first end 66 and a second aperture 74 adjacent the second end 68. In the illustrated construction, the blade supports 62, 64 are both pins. The apertures 72, 74 of the blade 58 receive the pins 62, 64, respectively, to removably couple the saw blade 58 to the frame 18.

Figure 4:
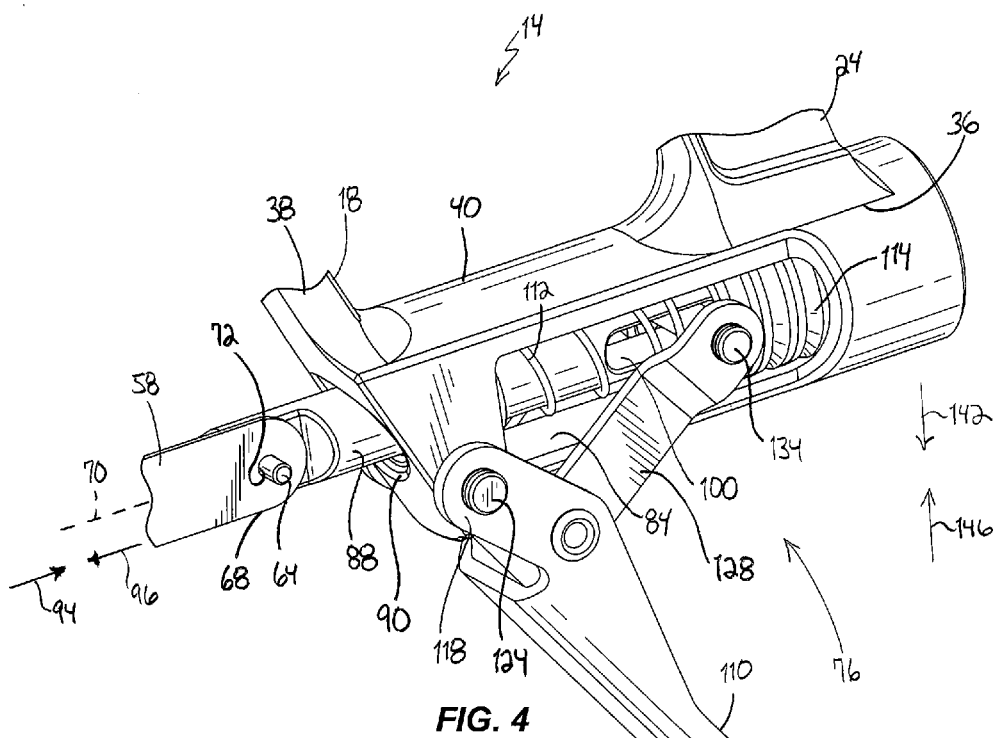
FIG. 4 is an enlarged view of a portion of the hand saw of FIG. 1 with the outer body and over-moldings removed and illustrating a tensioning lever of the saw in a release position.

The hacksaw 14 further includes a tensioning mechanism 76 that is operable to vary a distance 78 between the pins 62, 64 in order to apply tension to the blade 58. The tensioning mechanism 76 applies a relatively consistent amount of tension to blades 58 having different lengths or distances 80 between the apertures 72, 74. Referring to FIGS. 3 and 4, the tensioning mechanism 76 is partially housed within a cavity 84 formed in the base 40 of the frame 18. The tensioning mechanism 76 includes a rod 88 that extends through an aperture 90 formed in the base 40. The rod 88 is coupled the frame 18 such that the rod 88 slides with respect to the frame 18 through the aperture 90 in a first direction (direction of arrow 94 of FIG. 4) to increase the distance 78 (FIG. 1) between the pins 62, 64 and in a second direction (direction of arrow 96) to decrease the distance 78 between the pins 62, 64. As illustrated in FIG. 4, the first direction (arrow 94) is directly opposed to the second direction (arrow 96) and the first and second directions are both generally parallel to the longitudinal axis 70 of the blade 58.

Figure 2:
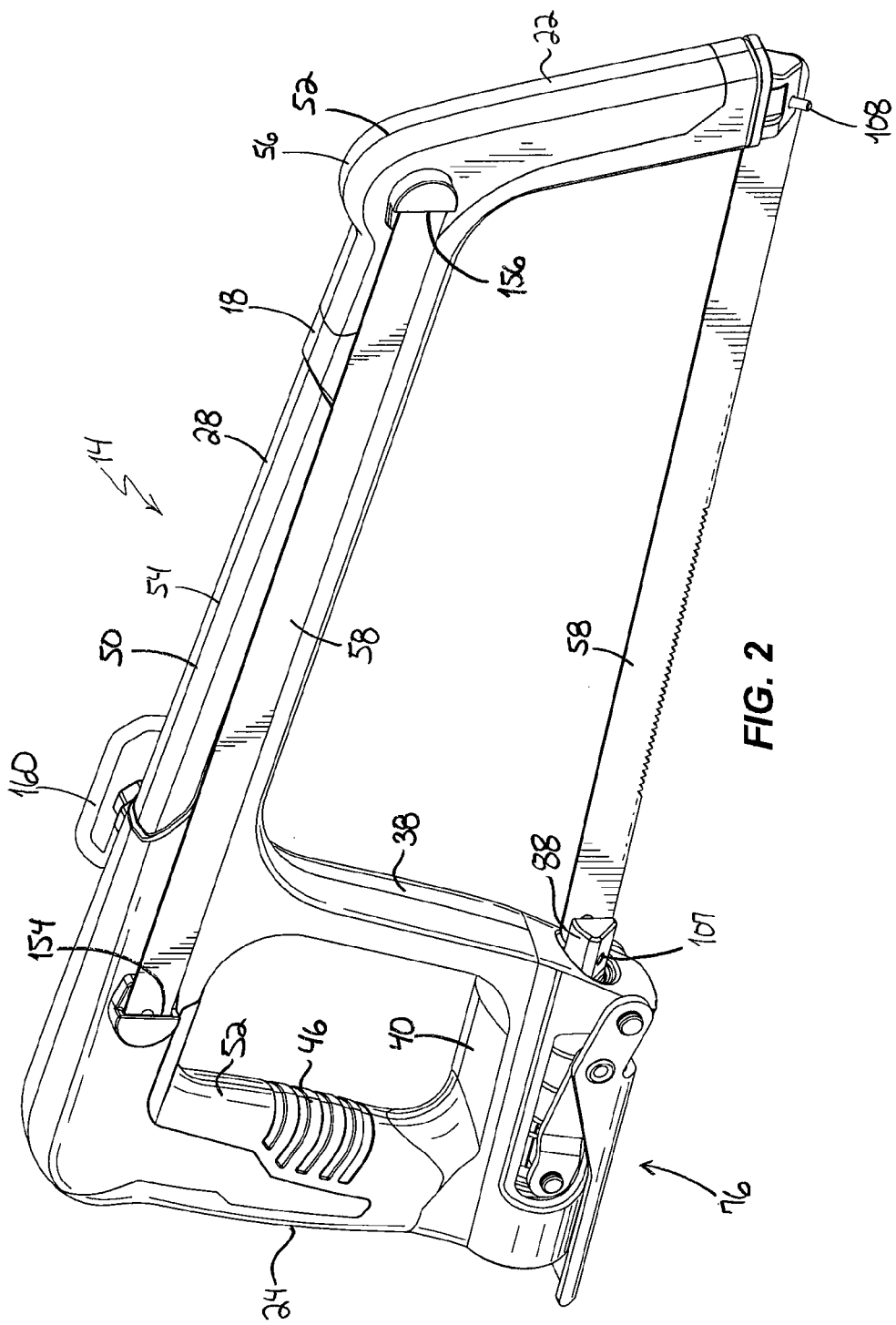
FIG. 2 is a perspective view of a second side of the hand saw of FIG. 1.

Referring to FIG. 3, the rod 88 includes an elongated aperture 100 that extends transversely through the rod 88, and the aperture 100 includes a first end 104 and a second end 106. The pin 64 for coupling the blade 58 to the frame 18 is coupled to the rod 88 for movement with the rod 88. Also, as illustrated in FIG. 2, the rod 88 includes an aperture 107. The aperture 107 may receive a pin, similar to a pin 108 coupled to the first leg 22 and the pin received in the aperture 107 may be used with the pin 108 to couple the blade 58 to the frame 18 at an angle.

Referring to FIGS. 1 and 3, the tensioning mechanism 76 further includes a lever 110, a first biasing member 112, and a second biasing member 114. The lever 110 includes a first end 118 and a second end 120. A pin 124 pivotally connects the lever 110 to the base 40 adjacent the first end 118 of the lever 110. Brackets 128 and 130 are pivotally coupled to the lever 110 between the first end 118 and the second end 120 of the lever 110. A pin 134 extends through the elongated aperture 100 of the rod 88 to pivotally couple the brackets 128, 130 to the rod 88 and to interconnect the lever 110 and the rod 88. The aperture 100 and the pin 134 are sized such that the pin 134 moves with respect to the rod 88 along the length of the aperture 100 or in the directions of arrows 94 and 96 of FIG. 4.

Referring to FIGS. 3 and 4, the first biasing member 112, which is a coil spring in the illustrated construction, contacts the base 40 proximate the support 38 and the pin 134 in order to bias the pin 134 in the direction of arrow 94. The second biasing member 114 is a stack of Belleville washers or disc springs in the illustrated construction. The disc springs 114 contact a washer 138, which is coupled to the base 40, proximate the end 34 of the second leg 24. The disc springs contact the washer 138 and the pin 134 to bias the pin 134 in the direction of arrow 96.

In operation, to load or attach the blade 58 to the hacksaw 14, the user places the lever 110 in a release position (FIG. 4) in order to release the tension of the saw blade 58. The user places the lever 110 in the release position by pivoting the lever 110 about the pin 124 downwardly, or in the direction of arrow 142. Next, the user inserts the pins 62, 64 of the hacksaw 14 through the apertures 72, 74 of the saw blade 58, respectively. When the lever 110 is in the release position, the rod 88 is movable with respect to the frame 18 in the directions of arrows 94, 96 to account for variations in the distance 80 between the apertures 72, 74 of the blade 58. In the illustrated construction, the elongated aperture 100 of the rod 88 allows the rod 88 to move in the directions of arrows 94, 96, independent of the lever 110, until one of the ends 104, 106 of the rod 88 contact the pin 134.

With the blade 58 coupled to the pins 62, 64 and the lever 110 in the release position, the coil spring 112 biases the pin 134 in the direction of arrow 94 to maintain the lever 110 in the position illustrated in FIG. 4 and to prevent the rod 88 from sliding too far out of the cavity 84. Therefore, a small amount of tension is placed on the blade 58 when the blade 58 is loaded and the lever 110 is in the release position. Next, the user moves the lever 110 to a tension position (FIG. 5) in order to apply tension to the saw blade 58. The user places the lever 110 in the tension position by pivoting the lever 110 about the pin 124 upwardly, or in the direction of arrow 146.

Figure 5:
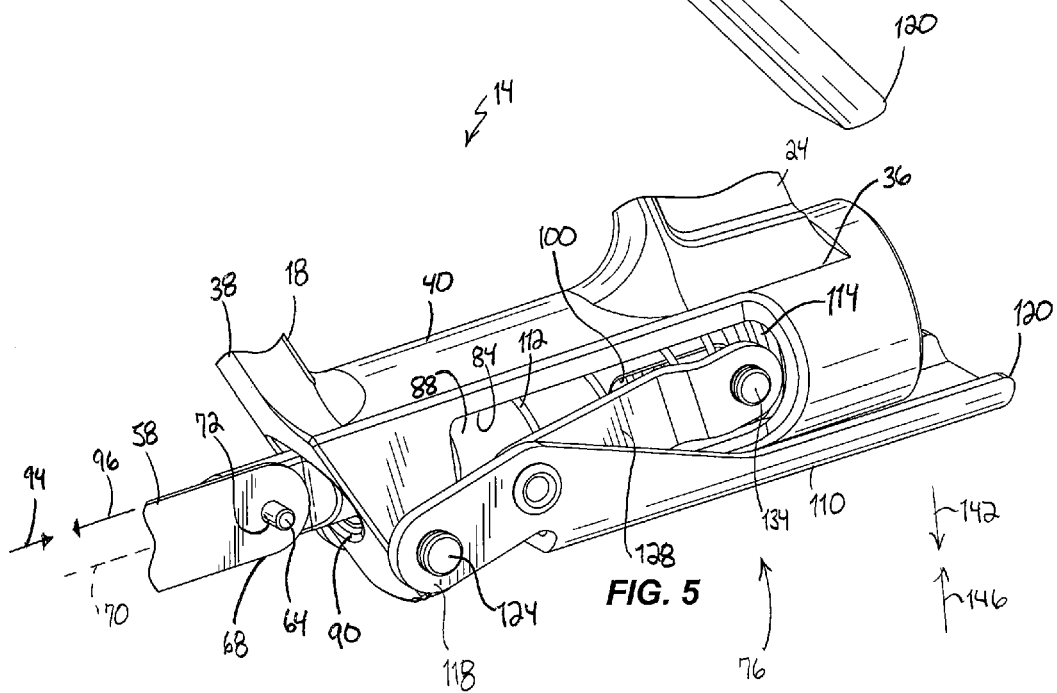
FIG. 5 is a view similar to FIG. 4, but illustrating the tensioning lever in a tension position.

Referring to FIGS. 4 and 5, as the user rotates the lever 110 toward the tension position, the rod 88, which is held in alignment by the base 40, is moved further into the cavity 84 in the direction of arrow 94. The rod 88 is moved in the direction of arrow 94 when the pin 134 of the tensioning mechanism 76 contacts the end 104 (FIG. 3) of the rod aperture 100. As the user continues to rotate the lever 110 and move the rod 88, the blade 58 is stretched in order to apply tension to the blade 58. Meanwhile, the frame 18 begins to flex or collapse in response to the tension of the blade 58. The flexing of the frame 18 is generally represented by the arrow 150 shown in FIG. 1. The user continues to rotate the lever 110 about the pin 124 until the lever 110 reaches the fully tension position, which is illustrated in FIGS. 1 and 5.

As the lever 110 is being rotated toward the tension position and the rod 88 moves into the cavity 84, the pin 134 pushes on or collapses the stack of disc springs 114, which regulates the amount of tension that is applied to the blade 58 and flexing or stress on the frame 18. The disc springs 114, due to their nature, require a specific amount of force and a specific amount of travel to flatten the springs 114. If the blade 58 happens to have a relatively short length 80 (FIG. 1), the disc springs 114 will collapse more than if the blade 58 has a relatively long length 80. When the disc springs 114 collapse more (e.g., with a relatively short blade), the frame 18 collapses less, which eases the stress on the frame 18 while maintaining sufficient tension in the blade 58. Conversely, if the blade 58 has a relatively long length 80, the disc springs 114 collapse relatively less and the frame 18 collapses relatively more than if the blade 58 has a relatively short length 80. Thus, a relatively consistent amount of tension is placed on the blade 58 and stress on the frame 18 regardless of slight variations in the length 80 of the blade 58.

Typically, the amount that a saw frame flexes or collapses due to tension of the blade is dependent on the length of the blade. However, the hacksaw 14 includes the blade tensioning mechanism 76 that provides a relatively consistent amount of tension of the blade 58 and stress of the frame 14 regardless of slight variations in the length 80 of the blade 58.

Referring to FIG. 1, with the blade 58 coupled to the frame 18 and tension applied to the blade 58, the user can grasp the handle 46 of the saw 14 to reciprocate the saw 14 along the longitudinal axis 70 of the blade 58 to cut a workpiece. When the blade 58 becomes dull or worn, the user may replace the blade 58 by moving the lever 110 to the release position and attach a new blade 58 to the frame 18 as discussed above. Meanwhile, the tensioning mechanism 76 will apply a relatively consistent amount of tension to the new blade 58 regardless of slight variations in the length 80 of the new blade.

Referring to FIG. 2, the hacksaw 14 also includes a storage location for a spare saw blade 58. The hacksaw 14 includes a first pocket 154 and a second pocket 156. The pockets 154, 156 are integrally molded with the injection molded cover 54 of the frame 14. The pockets 154, 156 each receive an end of the blade 58 to couple the spare blade 58 to the hacksaw 14.

Referring to FIG. 1, the saw 14 further includes a clip 160 coupled to the cross member 28 of the frame 18. The clip 160 can be used to couple the saw 14 to a user's work belt, ladder, tool bucket, or the like.

Figure 6:
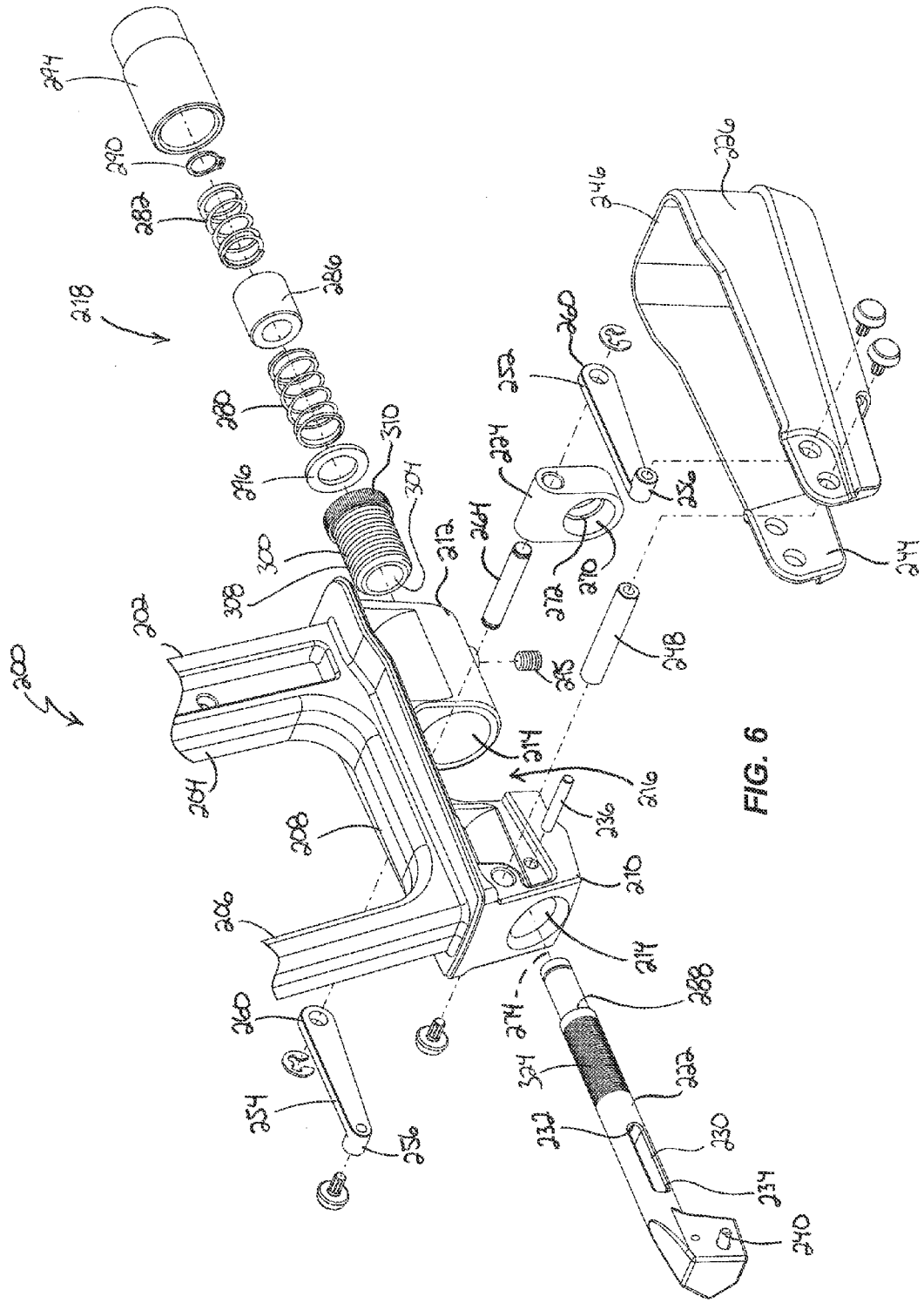
FIG. 6 is an exploded view of a hand saw according to another construction of the invention.
Figure 7:
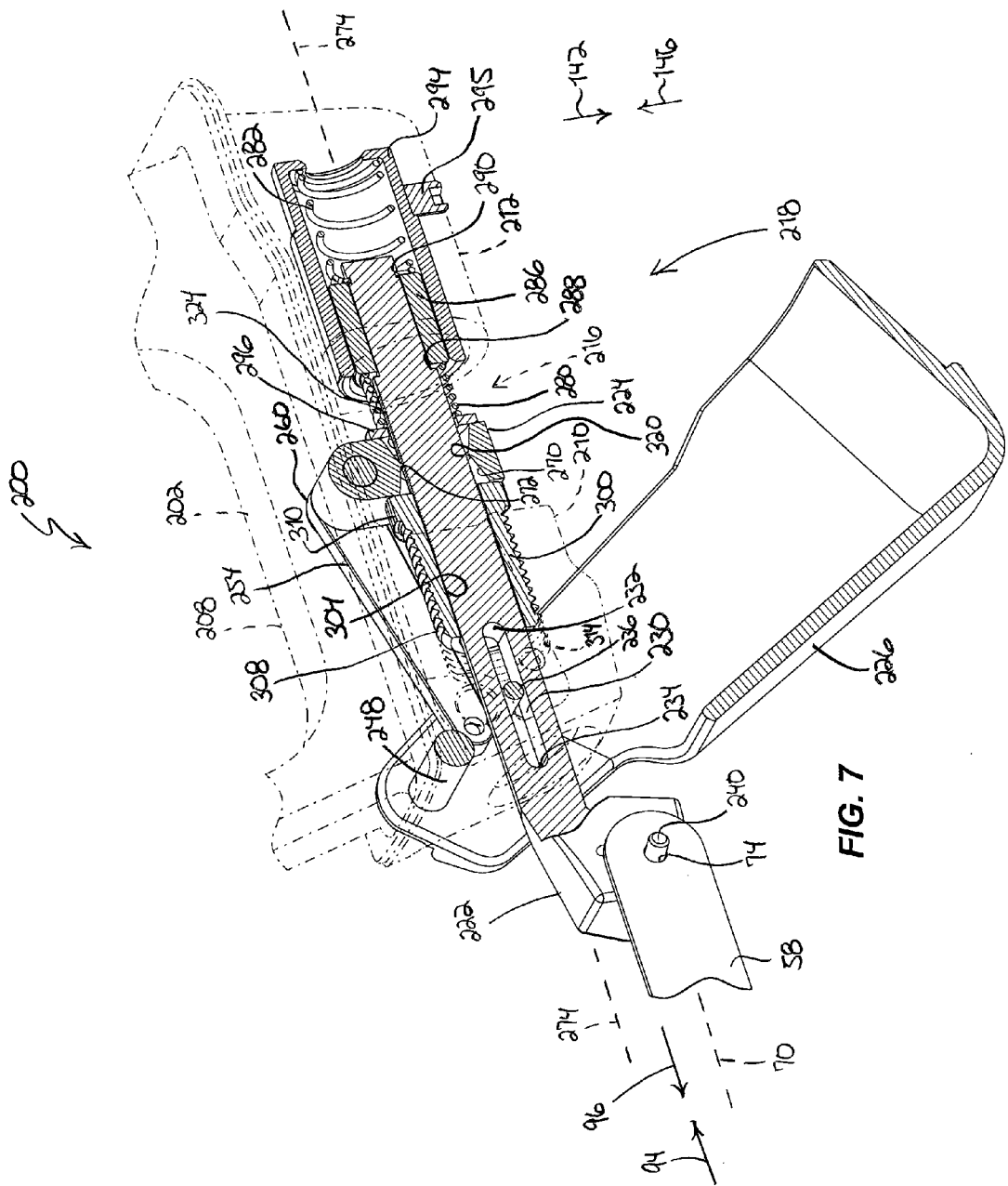
FIG. 7 is an enlarged partial cross-sectional view of the hacksaw of FIG. 6 illustrating the tensioning lever in the release position.
Figure 8:
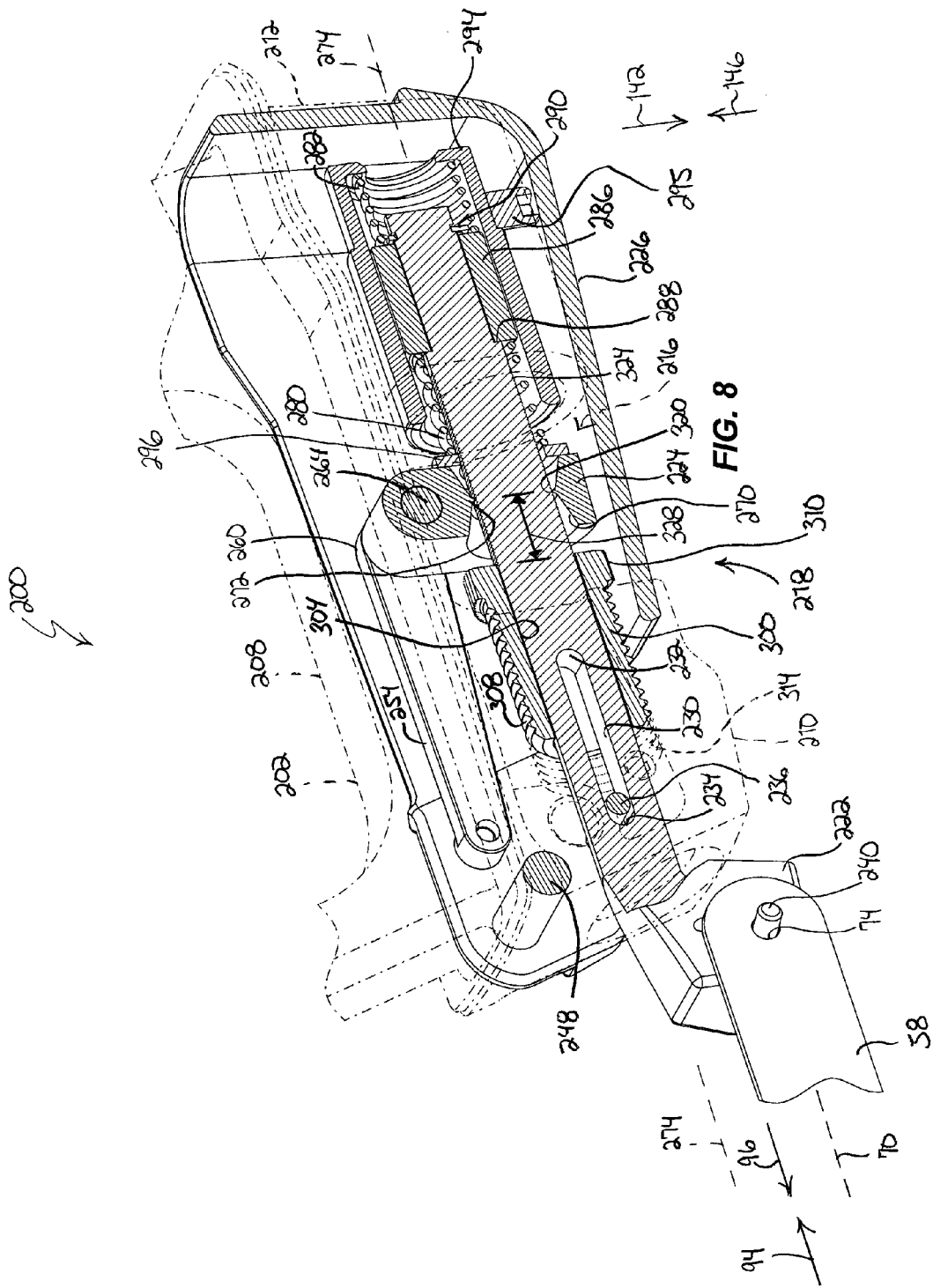
FIG. 8 is a view similar to FIG. 7, but illustrating the tensioning lever in a tension position.

FIGS. 6-8 illustrate a hand saw 200, which is a hacksaw in the illustrated construction, according to another construction of the invention. The hacksaw 200 includes a frame 202 that is similar to the frame 18 of the hacksaw 14 discussed above in regard to FIGS. 1-5, and only differences between the frames 18 and 202 will be discussed herein.

Referring to FIG. 6, the frame 202 includes a leg 204 that forms a handle of the saw 200. The frame 202 further includes a support member or handle guard 206 and a base 208 that connects ends of the leg 204 and the handle guard 206. The base 208 includes a first portion 210 and a second portion 212 that together define a cavity 214. A gap or space 216 is located between the first portion 210 and the second portion 212. The base 208 couples a tensioning mechanism 218 of the saw 200 to the frame 202.

Referring to FIG. 6, the tensioning mechanism 218 includes a rod 222, a clamp member 224, and a lever 226 that is configured to move the clamp member 224 with respect to rod 222 between an engaged position and a disengaged position, as discussed in more detail below.

The rod 222 includes an elongated aperture 230 that extends through the rod 222. The elongated aperture 230 includes a first end 232 and a second end 234 that is opposite the first end 232. A pin 236 extends through the first portion 210 of the base 208 and the elongated aperture 230, as illustrated in FIG. 7, to couple the rod 222 to the frame 202 and limit movement of the rod 222 with respect to the frame 202. Similar to the rod 88 of the saw 14 (FIGS. 1-5) discussed above, the rod 222 is configured to slide with respect to the frame 202 in a first direction (direction of arrow 94 of FIG. 7) and in a second direction (direction of arrow 96). As illustrated in FIG. 7, the first direction (arrow 94) is directly opposed to the second direction (arrow 96) and the first and second directions are both generally parallel to the longitudinal axis 70 of the blade 58. Also, similar to the rod 88 (FIGS. 1-5), a blade support 240, which is a pin in the illustrated construction, is coupled to the rod 222. Although not illustrated, the saw 200 includes another blade support similar to the pin 62 of the saw 14 of FIGS. 1-5.

Referring to FIG. 6, the lever 226 includes a first end 244 and a second end 246. A pin 248 pivotally couples the lever 226 to the base 208 adjacent the first end 244 of the lever 226. Brackets 252 and 254 are pivotally coupled to the lever 226 via a first pivoting end 256 of the brackets 252, 254. Second ends 260 of the brackets 252, 254, are pivotally coupled to the clamp member 224 via a pin 264. The brackets 252, 254 interconnect the clamp member 224 the lever 226 such that pivotal movement of the lever 226 about the pin 248 pivots the clamp member 224 with respect to the rod 222.

Referring to FIGS. 6 and 7, the clamp member 224 includes an aperture 270 through which the rod 222 extends. A projection 272 extends circumferentially around the inside of the aperture 270. The aperture 270 is sized slightly larger than the rod 222 such that the rod 222 can move with respect to the clamp member 224 in the direction of arrows 94 and 96 when the clamp member 224 is in the disengaged position, which is illustrated in FIG. 7 (i.e., the lever 226 is in a release position). As will be discussed in more detail below, when the clamp member 224 is slightly rotated about a longitudinal axis 274 of the rod 222 to the engaged position, which is illustrated in FIG. 8 (i.e., the lever 226 is in a tension position), the rod 222 binds within the aperture 270 such that clamp member 224 is coupled to the rod 222 for movement with the rod 222.

The tensioning mechanism 218 further includes a first biasing member 280 and a second biasing member 282, both of which are coil springs in the illustrated construction. The biasing members 280, 282 both contact a sleeve 286 to bias the rod 222 in opposite directions. The rod 222 extends through the sleeve 286 and the sleeve 286 is coupled to the rod 222 for movement with the rod 222 in the direction of arrows 94 and 96 via a ridge 288 of the rod 222 and a clamp 290. The sleeve 286 and a portion of the rod 222 are received in a cylinder 294. The cylinder 294 is coupled to the frame 202 within the cavity 214 using a fastener 295 such that the cylinder 294 is generally fixed with respect to the frame 202. The cylinder 294 is sized such that the sleeve 286 is received within the cylinder 294 and yet the sleeve 286 can slide with respect to the cylinder 294 in the directions of arrows 94, 96. The second biasing member 282 contacts the cylinder 294 and the sleeve 286 to bias the rod 222 with respect to the frame 202 in the direction of arrow 96. The first biasing member 280 contacts a washer 296 that contacts the clamp member 224 to bias the rod 222 with respect to the frame 202 in the direction of arrow 94.

The tensioning mechanism 218 further includes a tension adjustment member 300. In the illustrated construction, the tension adjustment member 300 is a threaded bushing. The bushing 300 includes an aperture 304, threads 308, and a knurled knob 310. The rod 222 extends through the aperture 304 of the bushing 300 and the rod 222 is able to move through the aperture 304 with respect to the bushing 300 in the direction of arrows 94, 96. The cavity 214 further includes threads 314 that engage threads 308 of the bushing 300 to couple the bushing 300 to the frame 202. The threads 308 and 314 allow the position of the bushing 300 with respect to the frame 202 to be varied by the user by rotating the bushing 300 (i.e., by grabbing and rotating the knurled knob 310), the purpose of which will be discussed in more detail below.

In operation, to load or attach the blade 58 (FIG. 1) to the hacksaw 200 of FIGS. 6-8, the user places the lever 226 in the release position (FIG. 7). The user places the lever 226 in the release position by pivoting the lever 226 about the pin 248 downwardly, or in the direction of arrow 142. Next, the user inserts the pin 240 through the aperture 74 of the blade 58. The user also attaches the blade 58 to a pin similar to the pin 62 of FIG. 1 using the aperture 72. When the blade 58 is initially coupled to the hacksaw 200, the rod 222 moves relative to the frame 202 and the clamp member 224. The movement distance depends upon a length of the attached blade or the distance 80 (FIG. 1) between the apertures 72, 74 of the blade 58. Then, the user pivots the lever 226 into the tension position by pivoting the lever 226 about the pin 248 upwardly, or in the direction of arrow 146, until the lever 226 reaches the fully tensioned position illustrated in FIG. 8.

As the user begins to rotate the lever 226 from the release position toward the tension position, rotation of the lever 226 slightly rotates the clamp member 224. The clamp member 224 rotates slightly about the axis 274 of the rod 222 from the disengaged position (FIG. 7) to the engaged position (FIG. 8). In the engaged position, the projection 272 of the clamp member 224 engages the rod at an engagement point 320 to bind the rod 222 within the aperture 270. A threaded exterior surface 324 of the rod 222 enhances engagement between the projection 272 and the rod 222. With the clamp member 224 in the engaged position, continued upward rotation of the lever 226 moves the clamp member 224 and the rod 222 together in the direction of arrow 94 to apply additional tension to the blade 58. Referring to FIG. 8, the lever 226 is rotated from the release position to the tension position to move the rod 222 a distance 328, which is measured between the bushing 300 and the clamp member 224. Moving the rod 222 in the direction of arrow 94 the distance 328 with respect to the frame 202 applies tension to the blade 58 that is a function of the distance 328.

If the saw blade 58 has a slightly different length 80 (FIG. 1), which is measured between apertures 72 and 74, the tensioning mechanism 218 applies approximately the same amount of tension to the blade 58 and stress on the frame 202 regardless of slight variations in the length 80 of the blade 58. Accordingly, for a relatively short blade 58, when the blade 58 is initially loaded (i.e., the lever 226 is in the released position) the rod 222 moves in the direction of arrow 96 to account for the relatively short blade 58 and the rod 222 moves independently of the lever 226 (e.g., the lever 226 generally does not rotate about pivot 248 and move the position of the clamp member 224). Thus, the rod 222 moves with respect to the frame 202 and the clamping member 224, against the bias of the spring 280 to account for the relatively short blade 58. The spring 280 applies a relatively small amount of tension to the blade 58 to retain the blade 58 on the pin 240. Then, when the lever 226 is rotated to the tension position, the lever 226 rotates the clamp member 224 to the engaged position to bind the rod 222 within the aperture 270 as discussed above. As a result, the rod 222 is moved the same distance 328 (FIG. 8), regardless of whether a relatively long or short blade is utilized. Conversely, for a relatively long blade 58, when the blade 58 is initially loaded, the rod 222 moves in the direction of arrow 94, with respect to the frame 202 and the clamp member 224, to account for the length of the blade 58. Then, when the lever 226 is rotated to the tensioned position, the lever 226 rotates the clamp member 224 to engage the rod 222 as discussed above. Again, as a result, the rod 222 is moved the same distance 328. Thus, a relatively consistent amount of tension is applied to relatively short or relatively long blades 58 because the distance 328 remains generally constant regardless of slight variations in the length of the blades 58.

The user may rotate the bushing 300 to adjust the amount of tension that is applied to the blade 58 by the tensioning mechanism 218. Referring to FIG. 7, when the lever 226 is in the release position, the biasing member 282 biases the clamp member 224 against the bushing 300. As discussed above, when the user rotates the lever 226, the clamp member 224 engages the rod 222 at the engagement point 320. Thus, if the user rotates the bushing 300 to move the bushing 300 in the direction of arrow 94, the engagement point 320 will also move in the direction of arrow 94, and thus the distance 328 will decrease, which decreases the amount of tension that is applied to the blade 58. Conversely, if the user rotates the bushing 300 to move the busing 300 in the direction of arrow 96, the engagement point 320 will also move in the direction of arrow 96, and thus the distance 328 will increase, which increases the amount of tension that is applied to the blade 58. However, as discussed above, once the user sets the desired amount of tension, a relatively consistent amount of tension will be applied to the blade 58 regardless of slight variations in the length of the blade 58 because the rod 222 moves independently from the clamp member 224 and the lever 226 when the user loads the blade.

Although the invention has been described in detail with reference to certain preferred embodiments, variations and modifications exist within the scope and spirit of one or more independent aspects of the invention as described.

What is claimed is:

1. A hand saw comprising:
   a blade having a first end, a second end, and a longitudinal axis that extends between the first end and the second end;
   a frame configured to support the blade, the frame including a first blade support configured to removably couple the blade to the frame and the frame defining a handle of the hand saw, the handle configured to be grasped by a user of the hand saw to reciprocate the blade along the longitudinal axis to cut a workpiece;
   a lever pivotally coupled to the frame such that the lever pivots with respect to the frame between a release position and a tension position;
   a rod including a second blade support configured to removably couple the blade to the frame, the rod coupled to the frame such that the rod is movable with respect to the frame in a first direction to increase a distance between the first blade support and the second blade support and the rod is movable with respect to the frame in a second direction to decrease the distance between the first blade support and the second blade support;
   a first biasing member that biases the rod toward the second direction;
   a second biasing member that biases the rod toward the first direction; and
   a clamp member movable between an engaged position and a disengaged position,
   wherein the rod is coupled to the lever and the frame such that the rod is movable in the first direction and with the lever when the lever moves from the release position toward the tension position in order to tension the blade,
   wherein the rod is coupled to the lever and the frame such that the rod is movable with respect to the frame in the first direction and the second direction independent of the lever when the lever is in the release position,
   wherein the clamp member moves to the engaged position in response to movement of the lever toward the tension position and to the disengaged position in response to movement of the lever toward the release position, wherein in the engaged position the clamp member engages the rod at an engagement point to interconnect the rod and the handle so that the rod moves in the first direction and with the lever when the lever moves toward the tension position in order to tension the blade, and wherein in the disengaged position the clamp member disengages the rod such that the rod is movable with respect to the frame in the first direction and the second direction.

2. The hand saw of claim 1, wherein the first direction is directly opposed to the second direction, and further wherein the first and the second directions are generally parallel to the longitudinal axis of the blade.

3. The hand saw of claim 1,
wherein the frame defines a cavity, and
wherein the rod includes a first portion located within the cavity and a second portion including the second blade support located outside of the cavity.

4. The hand saw of claim 1,
wherein the frame includes,
a first leg having a first end and a second end, the first blade support adjacent the first end of the first leg,
a second leg having a first end and a second end, the second leg defining at least a portion of the handle,
a cross member that extends from the second end of the first leg to the second end of the second leg generally along at least a portion of the longitudinal axis of the blade,
a support member that extends from the cross member, and
a base that extends from the support member to the first end of the second leg,
wherein the rod is at least partially located within the base of the frame.

5. The hand saw of claim 1,
wherein the lever includes a first end and a second end, and
wherein the lever is pivotally coupled to the frame by a pin adjacent the first end of the lever such that the lever pivots with respect to the frame about the pin.

6. A hand saw comprising:
a blade having a first end, a second end, and a longitudinal axis that extends between the first end and the second end;
a frame configured to support the blade, the frame including a first blade support configured to removably couple the blade to the frame and the frame defining a handle of the hand saw, the handle configured to be grasped by a user of the hand saw to reciprocate the blade along the longitudinal axis to cut a workpiece;
a lever pivotally coupled to the frame such that the lever pivots with respect to the frame between a release position and a tension position;
a rod including a second blade support configured to removably couple the blade to the frame, the rod coupled to the frame such that the rod is movable with respect to the frame in a first direction to increase a distance between the first blade support and the second blade support and the rod is movable with respect to the frame in a second direction to decrease the distance between the first blade support and the second blade support; and
a clamp member movable between an engaged position and a disengaged position,
wherein the rod is coupled to the lever and the frame such that the rod is movable in the first direction and with the lever when the lever moves from the release position toward the tension position in order to tension the blade,
wherein the rod is coupled to the lever and the frame such that the rod is movable with respect to the frame in the first direction and the second direction independent of the lever when the lever is in the release position,
wherein the clamp member moves to the engaged position in response to movement of the lever toward the tension position,
wherein the clamp member moves to the disengaged position in response to movement of the lever toward the release position, and
wherein in the engaged position the clamp member engages the rod at an engagement point to interconnect the rod and the handle so that the rod moves in the first direction and with the lever when the lever moves toward the tension position in order to tension the blade, and
wherein in the disengaged position the clamp member disengages the rod such that the rod is movable with respect to the frame in the first direction and the second direction.

7. The hand saw of claim 6, wherein the first direction is directly opposed to the second direction, and further wherein the first and the second directions are generally parallel to the longitudinal axis of the blade.

8. The hand saw of claim 6, further comprising,
a first biasing member that biases the rod toward the second direction; and
a second biasing member that biases the rod toward the first direction.

9. The hand saw of claim 8,
wherein the first biasing member includes a coil spring, and
wherein the second biasing member includes a coil spring.

10. The hand saw of claim 6, further comprising a tension adjustment member that engages the clamp member when the lever is in the release position and the clamp member is in the disengaged position to position the clamp member with respect to the rod, the tension adjustment member movable with respect to the frame to adjust the engagement point.

11. The hand saw of claim 10,
wherein the tension adjustment member includes a threaded bushing, and
wherein the rod extends through the treaded bushing.

12. The hand saw of claim 6, further comprising a biasing member located between the clamp member and the rod to bias the rod toward the first direction.

13. The hand saw of claim 6,
wherein the clamp member includes an aperture,
wherein the rod extends through the aperture, and
wherein the clamp member pivots with respect to the rod to move the clamp member between the engaged position and the disengaged position.

14. The hand saw of claim 6, further comprising,
a bracket that couples the lever and the clamp member to pivot the clamp member in response to movement of the lever between the release position and the tension position, the bracket having a first end and a second end,
wherein the first end of the bracket is pivotally coupled to the lever, and
wherein the second end of the bracket is pivotally coupled to the clamp member.

15. The hand saw of claim 6,
wherein the lever includes a first end and a second end, and
wherein the lever is pivotally coupled to the frame by a pin adjacent the first end of the lever such that the lever pivots with respect to the frame about the pin.

16. The hand saw of claim 6,
wherein the frame includes,
- a first leg having a first end and a second end, the first blade support adjacent the first end of the first leg,
- a second leg having a first end and a second end, the second leg defining at least a portion of the handle,
- a cross member that extends from the second end of the first leg to the second end of the second leg generally along at least a portion of the longitudinal axis of the blade,
- a support member that extends from the cross member, and
- a base that extends from the support member to the first end of the second leg, wherein the rod is at least partially located within the base of the frame.

* * * * *